June 3, 1958     E. J. KOCHER     2,836,967
FLAKE ICE MAKING APPARATUS

Filed Jan. 14, 1957     2 Sheets-Sheet 1

INVENTOR.
E. J. Kocher
BY
Lieber & Lieber
ATTORNEYS.

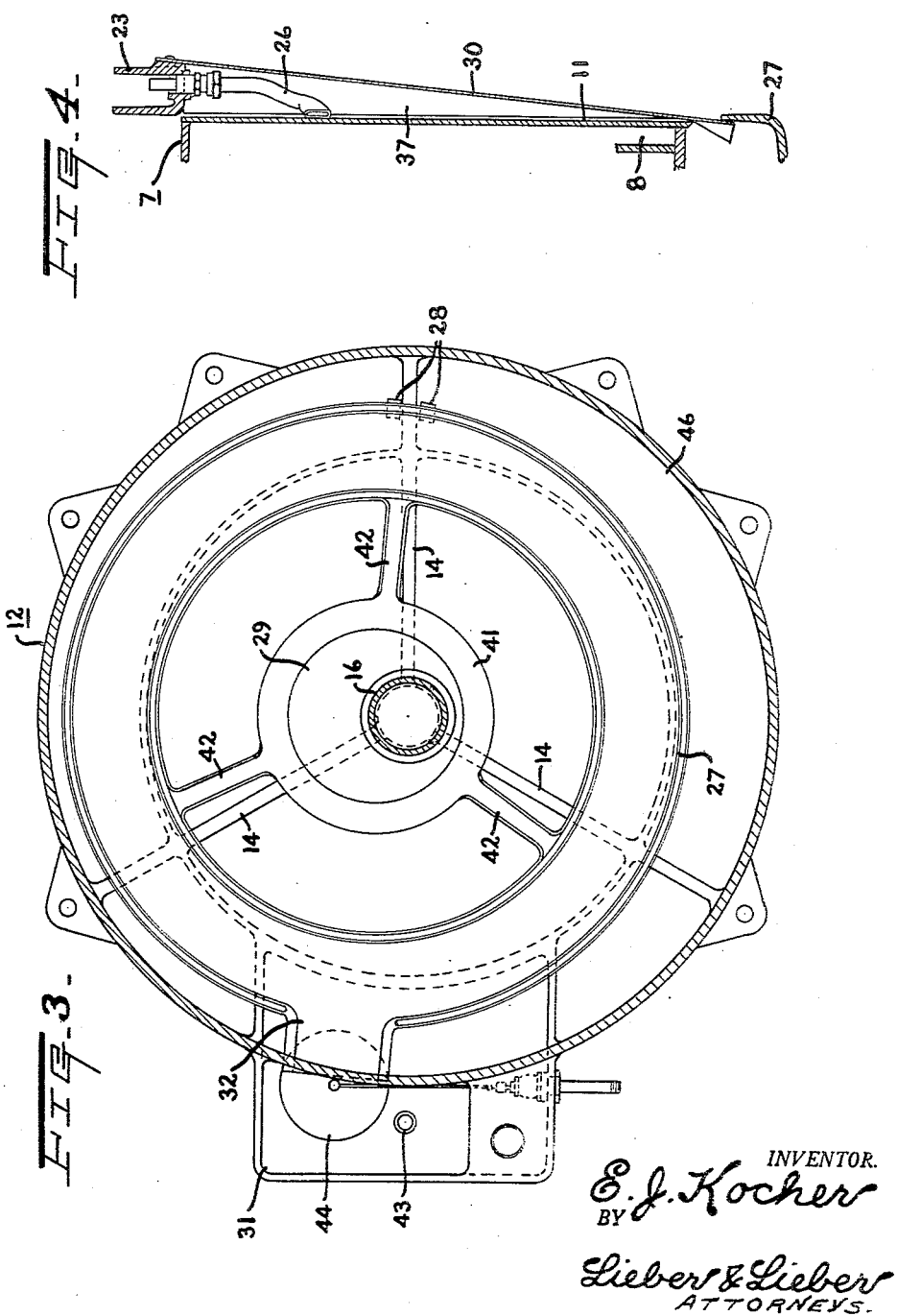

United States Patent Office 2,836,967
Patented June 3, 1958

2,836,967

FLAKE ICE MAKING APPARATUS

Erich J. Kocher, Milwaukee, Wis., assignor to The Vilter Manufacturing Co., Milwaukee, Wis., a corporation of Wisconsin Application January 14, 1957, Serial No. 634,023

12 Claims. (Cl. 62—107)

The present invention relates generally to improvements in the art of refrigeration, and relates more particularly to improvements in the construction and operation of machines for producing flake ice.

A primary object of the invention is to provide an improved flake ice making machine which is simple and durable in construction and which is moreover highly efficient in the commercial production of water-free flaked ice.

One of the most popular types of flake ice making machines presently in use embodies an upright refrigerated cylinder, means for flowing water upon the inner face of the cylinder to form ice, a plurality of knives carried by a rotor revolvable within the cylinder and having the cutting eges thereof movable along the freezing surface to remove the ice in flake form, and means at the bottom of the unit for collecting the ice and for separately collecting excess water dripping from the cylinder. However, despite the popularity of this type of apparatus, considerable difficulty has nevertheless been encountered in uniformly distributing the proper amounts of water over a properly confined area of the cylindrical freezing surface while preventing undesirable splashing and dripping of the water. Furthermore, although provision is made in these machines for segregating the flaked ice from excess water which cascades from the freezing cylinder and for separately collecting the same, the separating and collecting means heretofore proposed have either been complicated, impractical and objectionably costly, or they have been ineffective and insufficient for the production of flake ice having the desired extent of dryness.

It is therefore a more specific object of the present invention to provide an improved flake ice making apparatus which obviates these disadvantages and objections.

Another specific object of this invention is to provide an improved compact and unitary flake ice making device embodying novel and efficient means for uniformly and effectively distributing correct quantities of water over the proper areas of the freezing surface remote from the cutting zone during operation.

Another specific object of the invention is to provide an improved flake ice making apparatus which embodies novel means for effectively confining water distributed over the freezing surface to the desired zones and for preventing the same from splashing, spattering or dripping to unwanted areas.

Still another specific object of my invention is to provide an improved flake ice maker which incorporates novel and improved mechanism for effectively and positively separating falling ice flakes from excess water so as to insure the production of flake ice containing a minimum of moisture.

An additional specific object of my present invention is to provide an improved machine for commercially producing high quality flake ice which is automatically and continuously operable and which comprises relatively few parts, all of which are readily accessible for inspection, replacement or repair.

A further specific object of the present invention is to provide an improved flake ice making apparatus comprising a refrigerated jacket having an inner annular freezing surface, a rotor revolvable within the jacket, a plurality of knives carried by the rotor and having the cutting edges thereof movable along the freezing surface, means also carried by the rotor and revolvable with the knives for distributing water over the freezing surface remote from the cutting zone, an annular non-rotatable gutter at the lower end of the refrigerated jacket, and means carried by the rotor and revolvable with the knives for laterally moving the gutter to maintain that portion thereof below the cutting zone out of alinement with the freezing surface while maintaining that portion of the gutter below the water distributing zone in alignment with the freezing surface to catch excess water dripping therefrom.

These and other specific objects and advantages of the present invention will become apparent from the following detailed description.

A clear conception of the several features constituting the present improvement and of the mode of constructing and of utilizing typical flake ice making machines embodying the invention may be had by referring to the drawings accompanying and forming a part of this specification, wherein like reference characters designate the same or similar parts in the various views.

Fig. 3 is a horizontal section taken along the line 3—3 of Fig. 1 with the access cover to the drain outlet removed; and Fig. 4 is a fragmentary vertical section taken along the line 4—4 of Fig. 2 and showing the primary water distributor and water shield.

Figure 1:
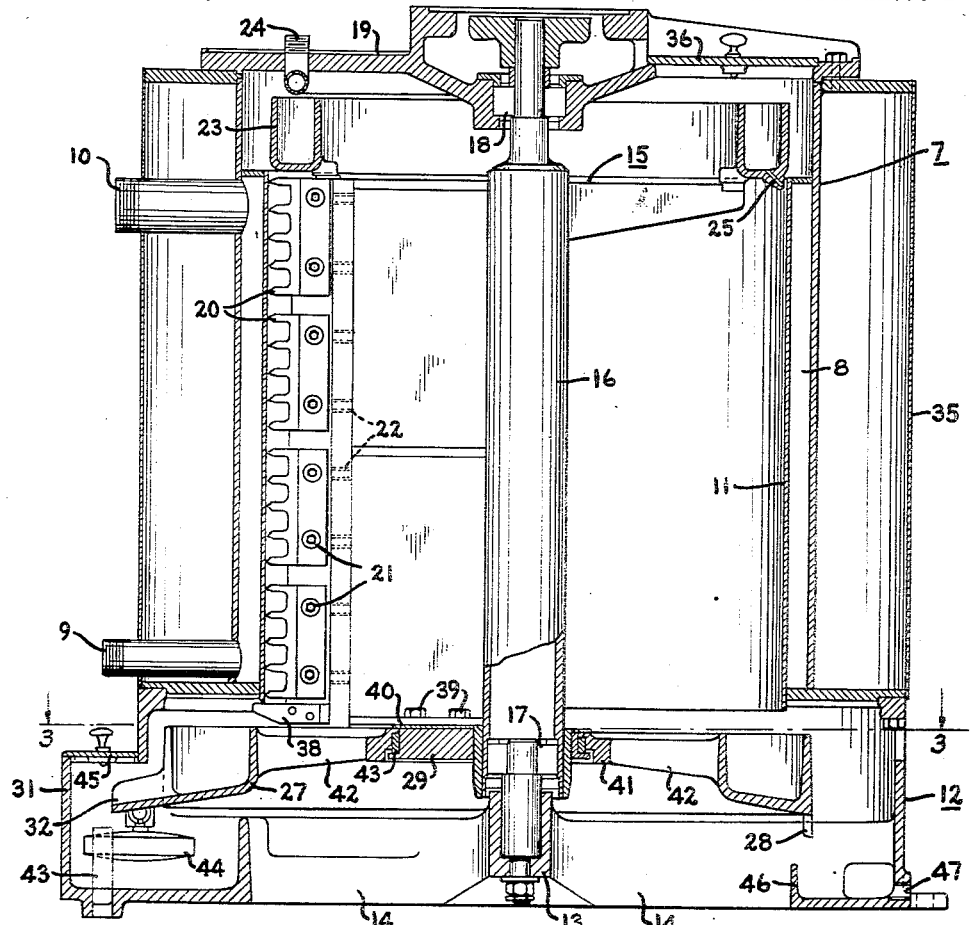
Fig. 1 is an approximately vertical section through a typical flake ice making unit embodying the invention.
Figure 2:
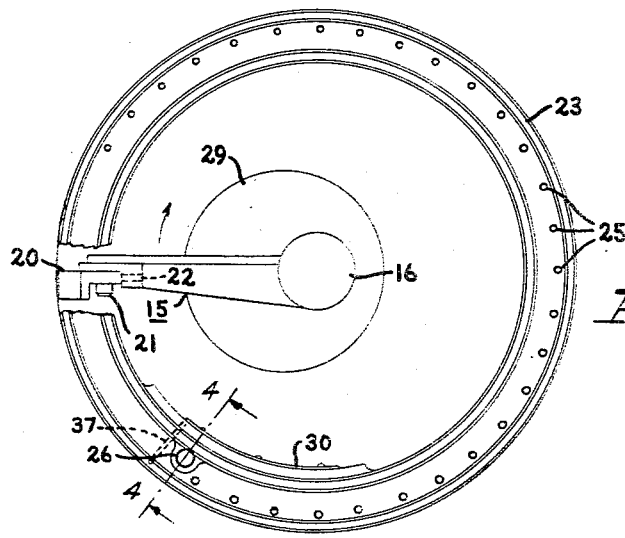
Fig. 2 is a top view of the water distributing trough with a portion thereof broken away to show the relationship of the cutting knives thereto.

While the present invention has been shown and described as being particularly applicable to a vertical ice-making unit having a cylindrical casing and in which the gutter is laterally movable or gyratable by means of a cam carried by the rotor shaft, it is not desired or intended to limit or restrict the invention by virtue of such specific embodiment; and it is also contemplated that certain specific descriptive terms used herein shall be given the broadest possible interpretation consistent with the disclosure.

Referring to the drawings, the typical flake ice making unit shown therein comprises, in general, a vertical double walled drum or cylindrical jacket 7 defining an annular space 8 adapted for circulation of a suitable refrigerant by way of the inlet 9 and suction outlet 10, the drum or cylinder 7 having an inner annular freezing surface 11 and being fixedly mounted in a suitable manner on a stationary frame or base 12 having a central hub portion 13 and radiating spider arms 14; a rotor 15 having a central shaft 16 supported by lower bearing 17 carried by the hub 13 of the base and supported in vertical position by an upper bearing 18 carried by the top cover plate 19 secured to the cylinder 7 as by means of bolts or the like, the rotor 15 being driven through its shaft 16 at the upper end thereof by means of a suitable motor driven at slow speed in a customary manner; a plurality of radially extending knives 20 detachably secured to the rotor 15 in a suitable manner as by means of bolts 21 or the like and having the cutting edges thereof movable along the freezing surface 11 as the rotor 15 is revolved, the knives 20 also being adjustable toward and away from the freezing surface as by means of suitable adjusting screws 22; means such as an annular water supply trough 23 also carried by the rotor 15 at the upper end of the cylinder 7 and receiving water from a distributor 24, the supply trough 23 being revolvable with the knives and being provided with a series of distributing ports 25 directed toward the freezing surface 11 on opposite sides of the cutting zone; a primary water distributing nozzle 26 depending from the trough 23 and directed tangentially toward the freezing surface 11 rearwardly of the cutting knives 20 as shown; an annular non-rotatable gutter 27 at the lower end of the refrigerated cylinder for catching excess water cascading down and dripping from the freezing surface 11, the gutter being positively held against rotation by means of lower stop lugs 28 or the like coacting with the spider arm 14 of the lower frame; means such as a crank or eccentric 29 carried by the shaft 16 of the rotor 15 and revolvable with the knives 20 for laterally moving the gutter 27 so as to maintain the portion thereof below the cutting zone out of alinement with the freezing surface 11 while maintaining the portion of the gutter 27 below the water distributing zone in alinement with the freezing surface 11 so as to catch excess water dripping from the freezing surface; a shield 30 secured at its upper end in a suitable manner to the water supply trough 23 adjacent to the distributing nozzle 27 and extending downwardly over the freezing surface inwardly of the nozzle 26 within the zone of water distribution for confining the water distributed by the nozzle to the freezing surface, the shield 30 being spaced from the freezing surface as shown with the lower end thereof extending into the gutter 27 for guiding excess water to the gutter; and a stationary chamber 31 located below the gutter at one side of the lower frame 12 for collecting water accumulated by the gutter, the water collecting chamber being located laterally beyond the vertical plane of the freezing surface and the gutter being provided with a spout portion 32 directed into the chamber 31 for guiding water thereto.

The cylindrical body 7 may be conveniently fabricated by welding or the like in usual fashion, and the casing may be bolted or otherwise secured to the frame 12 with the cover 19 being in turn secured to the casing by means of bolts or the like. The inner wall of the casing should, of course, be formed of a material having good heat conductivity so as to provide a smooth annular freezing surface 11, and the casing 7 may be surrounded by an aluminum lagging 35 or the like. Water may be supplied from a suitable source to the trough 23 by way of a water distributor header 24, and an access opening is preferably provided in the cover 19 as shown, the access opening being normally closed by means of a removable lid 36 or the like. As indicated, the shaft 16 and rotor 15 may be suitably rotated at slow speed by means of a motor, not shown, which may be coupled to the upper end of the shaft 16 through suitable speed reduction means. The knives 20 are preferably carried in sets as shown and are accurately adjustable so as to revolve with their cutting edges in very close proximity to the freezing surface 11 to thereby effectively wedge the ice from the surface 11 as it is formed, and the water distributing ports 25 as well as the nozzle 26 should be spaced some distance to either side of the cutters so as to insure dry ice at the zone of cutting. The nozzle 26 is, of course, positioned at the trailing side of the cutters so that the water distributed in relatively large amounts by the nozzle has sufficient opportunity to freeze over the surface 11 for practically a full revolution of the cutters, and the shield 30 is preferably formed with a front portion which is inwardly directed as at 37 to prevent any possible splashing of the water distributed by the nozzle to the cutting zone. To maintain the lower edge of the inner wall forming the freezing surface 11 free of ice as a result of water cascading down the wall 11, a lower knife 38 may also be provided which scrapes the lower edge of the wall 11 and constantly removes any ice formations therefrom. The crank or eccentric 29 may be detachably secured to the rotor 15 for rotation therewith as by means of bolts 39, and this cam is preferably covered by a top plate 40 to protect the same from splashing water or the like. For transmitting its eccentric action to the gutter 27, the cam 29 peripherally coacts with a hub portion 41 connected to the gutter 27 as by means of spider arms 42, and a suitable water collector bushing 43 may be interposed between the peripheral surface of the cam 29 and the hub 41. Since the gutter 27 is gyrated by the cam 29 as the shaft 16 revolves, the spout 32 of the gutter should extend laterally outwardly into the chamber 31 to insure discharge of the water collected by the gutter into the collection chamber. The excess water collection chamber 31 is also provided with a suitable drain 43 and with a float 44 controlling a water return valve, and the water collected within the chamber 31 may be returned to the distributor header 24 for re-use. To obtain access to the chamber 31 for periodic inspection or the like, the chamber may also be provided with an access opening which is normally closed by a cover 45. While the excess water is effectively collected within the gutter 27 and is transferred to the collection chamber 31, a certain amount of objectionable condensate may nevertheless drip from the gutter and other parts of the unit, and to collect this condensate, the base or frame 12 is preferably formed with an annular trough portion or sump 46 as shown, the sump being provided with suitable drainage openings 47 for removal of any condensate which may be collected therein.

In operation, water is supplied to the upper trough 23 by means of the header 24, and water is distributed in an obvious manner from the trough 23 through the distributor ports 25 and nozzle 26. As the rotor 15 is revolved at slow speed, the water distributed to the freezing surface 11 cascades over the surface in a film and forms a layer of ice. The cutters which are also carried by the rotor and are revolved therewith effectively disintegrate the ice film and the resultant flakes fall by gravity from the surface 11. Since the lower gutter 27 is gyrated upon rotation of the shaft 16 and rotor 15 by means of the cam 29 carried by the shaft, the ice removed within the cutting zone is permitted to fall to the central unobstructed portion of the unit, the gutter within the zone of cuting being constantly maintained outside of the vertical plane of the freezing surface 11. Simultaneously, the cam 29 causes the portion of the gutter within the water distributing zone to move and be maintained in alinement with the freezing surface 11 so that the excess water cascading down this surface is effectively caught by the gutter and is discharged by way of the spout 32 to the water collection chamber 31 from which it is drained or re-used. This action continues as long as the cylinder 7 is refrigerated and during the revolution of the rotor 15, and the dry ice which is accumulated within the central portion of the frame 12 may be periodically removed as desired.

From the foregoing detailed description, it is believed apparent that the present invention contemplates the provision of a flake ice making machine of simple, compact and durable construction in which all parts are automatically and positively actuated to efficiently produce dry flake ice of highest quality. The water distributing mechanism which is revolvable with the cutters most effectively distributes water over the freezing surface 11 so as to form a layer of ice on the freezing surface of uniform thickness, the nozzle 26 supplying relatively large quantities of liquid in a most efficient manner in a zone immediately following the zone of cutting with the distributing ports 25 supplying a curtain of water over the entire water distributing area in advance of the cutters. In addition, the shield 30 effectively confines the stream of water emitted from the nozzle 26 to the freezing surface and prevents inadvertent splashing of the water into the cutting zone and on to working parts of the apparatus and guides the water downwardly into the gutters, and this shield 30 is preferably formed of relatively flexible sheet material for obvious reasons. A primary feature of the invention is, of course, the means for positively laterally moving the lower water receiving gutter 27 so as to maintain that portion of the gutter below the knives 20 out of alinement with the freezing surface of the cylinder at all times to permit the flake ice falling from the cutting zone to fall freely into the center of the unit, and for purposes of convenience in gathering the flake ice produced by the unit, the frame 12 may be raised from the ground with a pan or other container being positioned under the unit to receive and hold the ice flakes for removal as required. The crank or eccentric means for positively gyrating the gutter is extremely simple but is, however, accurate and positive in action, and as the gutter below the cutting zone is moved out of alinement with the freezing surface 11, the portion of the gutter lying within the zone of water distribution is simultaneously always maintained in alinement with the freezing surface so as to receive and separate the excess water from the removed ice flakes. The improved flake ice making devices have proven extremely satisfactory in actual use, and the ice flakes produced by these units have in fact contained minimum amounts of moisture.

It should be understood that it is not desired or intended to limit this invention to the exact details of construction or to the precise mode of use herein shown and described, since various modifications within the scope of the appended claims may occur to persons skilled in the art to which this invention pertains.

I claim:

1. A flake ice making machine comprising, a refrigerated jacket having an inner annular freezing surface, a rotor revolvable within said jacket, a plurality of knives carried by said rotor and having the cutting edges thereof movable along said freezing surface, means for distributing water over said freezing surface remote from the cutting zone, an annular non-rotatable gutter at the lower end of said refrigerated jacket, and means carried by said rotor and revolvable with said knives for laterally moving said gutter to maintain the portion thereof below the cutting zone out of alinement with said freezing surface while maintaining the portion of said gutter below the water distributing zone in alinement with said freezing surface to catch excess water dripping therefrom.

2. A flake ice making machine comprising, a refrigerated upright cylinder having an inner annular freezing surface, a rotor revolvable within said cylinder, a plurality of knives carried by said rotor and having the cutting edges thereof movable along said freezing surface, means for distributing water over said freezing surface remote from the cutting zone, an annular non-rotatable gutter at the lower end of said refrigerated cylinder, and means carried by said rotor and revolvable with said knives for gyrating said gutter to maintain the portion thereof below the cutting zone out of vertical alinement with said freezing surface while maintaining the portion of said gutter below the water distributing zone in alinement with said freezing surface to catch excess water dripping therefrom.

3. A flake ice making machine comprising, a refrigerated upright cylinder having an inner annular freezing surface, a rotor revolvable within said cylinder, a plurality of knives carried by said rotor and having the cutting edges thereof movable along said freezing surface, means for distributing water over said freezing surface remote from the cutting zone, an annular non-rotatable gutter at the lower end of said refrigerated cylinder, and an eccentric carried by said rotor for rotation with said knives and coacting with said gutter for gyrating the same to maintain the portion thereof below the cutting zone out of vertical alinement with said freezing surface while maintaining the portion of said gutter below the water distributing zone in alinement with said freezing surface to catch excess water dripping therefrom.

4. A flake ice making machine comprising, a refrigerated upright cylinder having an inner annular freezing surface, a rotor revolvable within said cylinder, a plurality of knives carried by said rotor and having the cutting edges thereof movable along said freezing surface, means for distributing water over said freezing surface remote from the cutting zone, an annular gutter at the lower end of said refrigerated cylinder, means for positively preventing rotation of said gutter, and an eccentric carried by said rotor for rotation with said knives and peripherally supporting said gutter for gyrating the same to maintain the portion thereof below the cutting zone out of vertical alinement with said freezing surface while maintaining the portion of said gutter below the water distributing zone in alinement with said freezing surface to catch excess water dripping therefrom.

5. A flake ice making machine comprising, a refrigerated upright cylinder having an inner annular freezing surface, a rotor revolvable within said cylinder, a plurality of knives carried by said rotor and having the cutting edges thereof movable along said freezing surface, means for distributing water over said freezing surface remote from the cutting zone, an annular non-rotatable gutter at the lower end of said refrigerated cylinder, an eccentric carried by said rotor for rotation with said knives and coacting with said gutter for gyrating the same to maintain the portion thereof below the cutting zone laterally beyond the vertical plane of said freezing surface while maintaining the portion of said gutter below the water distributing zone within the vertical plane of said freezing surface to catch excess water dripping therefrom, and a stationary chamber below said gutter for collecting water discharged from said gutter, said water collecting chamber being located laterally beyond the vertical plane of said freezing surface.

6. A flake ice making machine comprising, a refrigerated upright cylinder having an inner annular freezing surface, a rotor revolvable within said cylinder, a plurality of knives carried by said rotor and having the cutting edges thereof movable along said freezing surface, means for distributing water over said freezing surface remote from the cutting zone, an annular non-rotatable gutter at the lower end of said refrigerated cylinder, said gutter having a laterally directed discharge spout, an eccentric carried by said rotor for rotation with said knives and coacting with said gutter for gyrating the same to maintain the portion thereof below the cutting zone laterally beyond the vertical plane of said freezing surface while maintaining the portion of said gutter below the water distributing zone within the vertical plane of said freezing surface to catch excess water dripping therefrom, and a stationary chamber below said gutter discharge spout for collecting water accumulated by said gutter, said water collecting chamber being located laterally beyond the vertical plane of said freezing surface.

7. A flake ice making machine comprising, a refrigerated upright cylinder having an inner annular freezing surface, a rotor revolvable within said cylinder, a plurality of radiating knives carried by said rotor and having the cutting edges thereof movable along said freezing surface, means for distributing water over said freezing surface remote from the cutting zone, an annular gutter at the lower end of said refrigerated cylinder, said gutter having a laterally directed discharge spout, stop lugs on on said gutter coacting with a fixed element for positively preventing rotation thereof, an eccentric carried by said rotor for rotation with said knives and supporting said gutter for gyrating the same to maintain the portion thereof below the cutting zone laterally beyond the vertical plane of said freezing surface while maintaining the portion of said gutter below the water distributing zone within the vertical plane of said freezing surface to catch excess water dripping therefrom, a stationary chamber below said gutter discharge spout for collecting water accumulated by said gutter, said water collecting chamber being located laterally beyond the vertical plane of said freezing surface, and means for draining said water collection chamber.

8. A flake ice making machine comprising, a refrigerated cylinder having an inner annular freezing surface, a rotor revolvable within said cylinder, a plurality of knives carried by said rotor and having the cutting edges thereof movable along said freezing surface, means also carried by said rotor and revolvable with said knives for distributing water over a major area of said freezing surface remote from the cutting zone, an annular non-rotatable gutter at the lower end of said refrigerated cylinder, and means carried by said rotor and revolvable with said knives for laterally moving said gutter to maintain the portion thereof below the cutting zone out of alinement with said freezing surface while maintaining the portion of said gutter below the water distributing zone in alinement with said freezing surface to catch excess water dripping therefrom.

9. A flake ice making machine comprising, a refrigerated cylinder having an inner annular freezing surface, a rotor revolvable within said cylinder, a plurality of knives carried by said rotor and having the cutting edges thereof movable along said freezing surface, an annular water supply trough also carried by said rotor at the upper end of said cylinder and revolvable with said knives, said trough having a series of distributing ports directed toward said freezing surface on opposite sides of the cutting zone, an annular non-rotatable gutter at the lower end of said refrigerated cylinder, and means carried by said rotor and revolvable with said knives for laterally moving said gutter to maintain the portion thereof below the cutting zone out of alinement with said freezing surface while maintaining the portion of said gutter below the water distributing zone in alinement with said freezing surface to catch excess water dripping therefrom.

10. A flake ice making machine comprising, a refrigerated cylinder having an inner annular freezing surface, a rotor revolvable within said cylinder, a plurality of knives carried by said rotor and having the cutting edges thereof movable along said freezing surface, an annular water supply trough also carried by said rotor at the upper end of said cylinder and revolvable with said knives, a water distributing nozzle depending from said trough and directed tangentially toward said freezing surface rearwardly of said knives, an annular non-rotatable gutter at the lower end of said refrigerated cylinder, and means carried by said rotor and revolvable with said knives for laterally moving said gutter to maintain the portion thereof below the cutting zone out of alignment with said freezing surface while maintaining the portion of said gutter below the water distributing zone in alinement with said freezing surface to catch excess water dripping therefrom.

11. A flake ice making machine comprising, a refrigerated cylinder having an inner annular freezing surface, a rotor revolvable within said cylinder, a plurality of knives carried by said rotor and having the cutting edges thereof movable along said freezing surface, an annular water supply trough also carried by said rotor at the upper end of said cylinder and revolvable with said knives, a water distributing nozzle depending from said trough and directed tangentially toward said freezing surface rearwardly of said knives, an annular non-rotatable gutter at the lower end of said refrigerated cylinder, means carried by said rotor and revolvable with said knives for laterally moving said gutter to maintain the portion thereof below the cutting zone out of alinement with said freezing surface while maintaining the portion of said gutter below the water distributing zone in alinement with said freezing surface to catch excess water dripping therefrom, and a shield secured at its upper end to said water supply trough adjacent to said distributing nozzle and extending downwardly over said freezing surface in the zone of water distribution for confining the water distributed by said nozzle.

12. A flake ice making machine comprising, a refrigerated cylinder having an inner annular freezing surface, a rotor revolvable within said cylinder, a plurality of knives carried by said rotor and having the cutting edges thereof movable along said freezing surface, an annular water supply trough also carried by said rotor at the upper end of said cylinder and revolvable with said knives, a water distributing nozzle depending from said trough and directed tangentially toward said freezing surface rearwardly of said knives, an annular non-rotatable gutter at the lower end of said refrigerated cylinder, means carried by said rotor and revolvable with said knives for laterally moving said gutter to maintain the portion thereof below the cutting zone out of alinement with said freezing surface while maintaining the portion of said gutter below the water distributing zone in alinement with said freezing surface to catch excess water dripping therefrom, and a shield secured at its upper end to said water supply trough adjacent to said distributing nozzle and extending downwardly over said freezing surface in the zone of water distribution for confining the water distributed by said nozzle, said shield being spaced from said freezing surface with the lower end thereof extending into said gutter.

References Cited in the file of this patent

UNITED STATES PATENTS

| | | |
|---|---|---|
| 2,310,468 | Short | Feb. 9, 1943 |
| 2,716,869 | Lees | Sept. 6, 1955 |
| 2,758,451 | Lauterbach | Aug. 14, 1956 |